United States Patent [19]

Sauer

[11] 4,318,375
[45] Mar. 9, 1982

[54] INTERNAL COMBUSTION ENGINE

[76] Inventor: Heinrich Sauer, Nieder-Olmer-Str. 16, 6501 Ober-Olm, Fed. Rep. of Germany

[21] Appl. No.: 28,269

[22] Filed: Apr. 9, 1979

[30] Foreign Application Priority Data

Nov. 14, 1978 [DE] Fed. Rep. of Germany ....... 2849257

[51] Int. Cl.³ ............................ F02F 7/00; F16C 9/02
[52] U.S. Cl. .................................. 123/195 R; 308/23
[58] Field of Search ...................... 123/195 R, 195 A; 308/23; 92/261

[56] References Cited

U.S. PATENT DOCUMENTS

| 940,650 | 11/1909 | Herreshoff | 308/23 |
| 1,909,977 | 5/1933 | Miller | 308/23 |
| 1,972,752 | 9/1934 | Balough | 123/195 R |
| 3,046,953 | 7/1962 | Dolza | 123/195 R |
| 3,521,613 | 7/1970 | Celli | 123/195 R |

FOREIGN PATENT DOCUMENTS

| 830647 | 8/1938 | France | 123/195 R |
| 289026 | 3/1965 | Netherlands | 123/195 R |

Primary Examiner—Craig R. Feinberg
Attorney, Agent, or Firm—Gordon W. Hueschen

[57] ABSTRACT

An internal combustion engine, in particular for the driving of an aircraft, having a bipartite crankshaft case to receive the cylinder blocks in opposed arrangement; having three crankshaft bearings to receive the crankshaft and with screw-thread means arranged on both sides on the periphery of the crankcase bearings in order to clamp the crankcase halves together, the central screw-thread means being developed in a first crankshaft case part as continuous boreholes without thread, characterized by the fact that in the second crankshaft case part (1) there are provided continuous boreholes (9, 11) with threaded sections (22, 23) in the region adjoining the first part of the case and that first and second tie rods (8, 10) with threaded sections (12, 13; 20, 21) on both ends for engagement with clamping nuts and, in each case, a threaded section (16, 17) in the central region of the shaft for engagement with the corresponding threaded sections (16, 17) arranged in the second crankcase part (1) are provided.

3 Claims, 4 Drawing Figures

INTERNAL COMBUSTION ENGINE

The present invention relates to an internal combustion engine and concerns in particular an internal combustion engine for the driving of an aircraft, having a bipartite crankshaft case to receive the cylinder blocks in an opposed cylinder arrangement, with three crankshaft bearings to receive the crankshaft and with screw-thread means arranged on the two sides of the circumference of the crankshaft bearings in order to clamp the crankshaft case together, the central screw/screw-thread means being developed in a first crankshaft case part as continuous unthreaded boreholes.

Such internal combustion engines are ordinarily used for automotive vehicles and due to their large numbers are of relatively low price and high operating reliability. This has the result that such engines are being more and more frequently used for the driving of aircraft, particularly gliders, so-called power gliders, since in addition to the advantages mentioned above they also have the advantage of a low weight, which is particularly important for a power glider when it is flying without power drive. The output of such engines is generally sufficient during flight to pass over an area having weak thermals but is too slight for the take-off and landing of the aircraft, so that there is increased danger for the pilot of such an aircraft upon flight near the ground.

All attempts to increase the power of such an internal combustion engine in such a manner that it can continue to be used as glider engine have failed, either because of increase in weight or lack of reliability in operation. It has been found, namely, that the crankcase designed for an automobile motor was not capable of taking up the vibrations introduced into the crankshaft by the propeller, particularly when it was attempted to increase the power of the internal combustion engine, so that leaks occurred between the two crankcase halves. Attempts to avoid these leaks by increased clamping of the crankcase halves, or a "bulging" of the crankcase in the vicinity of the central crankshaft bearing also failed since the material of the crankcase, which is ordinarily cast aluminum, cracked.

This cracking is due to the design of the screw-thread means in the crankcase of such a mass-produced internal combustion engine. While the one half of the crankcase is provided with a continuous borehole without thread, the other half of the case has a blind hole with thread. A continuous borehole is not provided since the oil feed duct for the crankshaft bearing extends directly below the end of the blind hole. While now in the case of more firmly clamped crankcases the one half of the crankcase is subjected to greater compressive stress the other part of the case is subjected to greater tensile stress, which leads to the formation of cracks in the case produced of aluminum casting. The drilling of the blind hole with intersection of the oil feed duct for the central crankshaft bearing, and the use of ordinary tie rods also failed to provide the desired results since difficulties arose with regard to the supplying of oil to the crankshaft bearing, as well as problems with regard to sealing, and therefore once again problems of leakage between the two crankcase halves, since the lower crankcase half which is weakened by the oil feed duct limits the initial stress which can be applied.

The object of the present invention is to develop an internal combustion engine of the above-mentioned type in such a way that a substantially better clamping together of the crankcase parts is made possible.

This is achieved in the manner that continuous boreholes having threaded sections in the region adjoining the first part of the case are provided in the second crankcase part, and that first and second tie rods having threaded sections on both ends for engagement with clamping nuts and in each case a threaded section in the central section of the shaft for engagement with the corresponding threaded sections arranged in the second part of the case are provided.

With such screw-thread arrangement there is obtained in advantageous fashion a more uniform distribution of the forces in the lower crankcase half, and in particular the high tensile stresses which are particularly injurious to aluminum castings are avoided, whereby the formation of cracks in the crankcase is avoided and greater reliability in operation is assured even with increased power.

As a further advantageous development it is contemplated that the shafts of the first and second tie rods have the same shaft diameter in the region associated with the first part of the crank case and unequal shaft diameters in the region associated with the second part of the crankcase, while the boreholes in the second part of the crankcase have the same diameter.

In this way there is assured a sufficient and reliable supply of oil to the central crankshaft bearing through the annular space formed between borehole and shaft, the borehole intersecting the oil feed duct.

One illustrative embodiment of the invention is shown in the drawing and will be described in further detail below. In the drawing.

Figure 1:
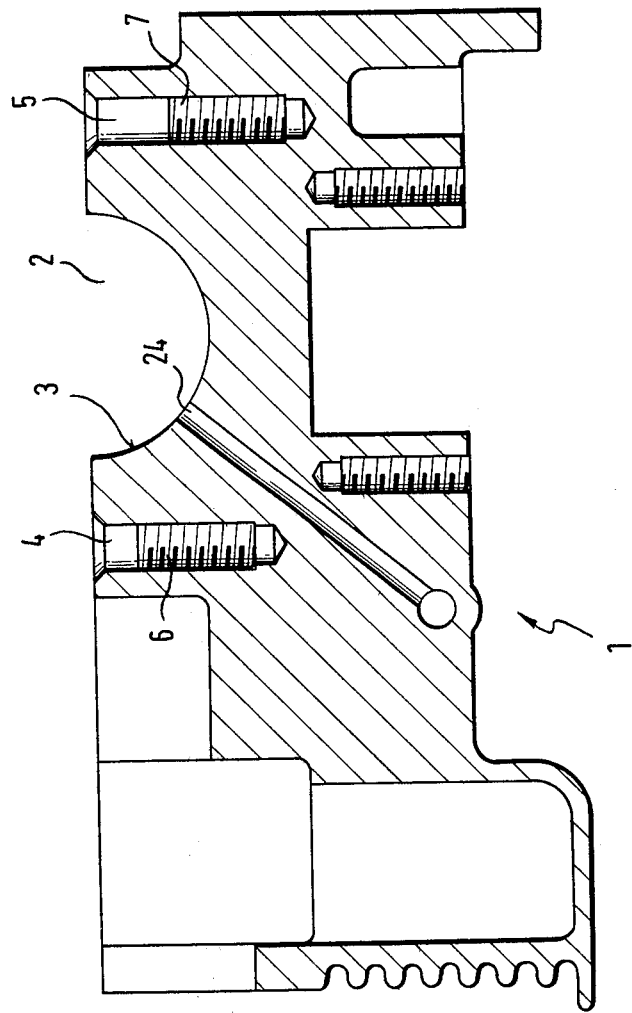
FIG. 1 shows a crankcase half of an ordinary mass-produced internal combustion engine, seen in cross section.

FIG. 1 is a section through a crankcase half 1 of an ordinary internal combustion machine with cylinder blocks in opposed cylinder arrangement and three crankshaft bearings along the middle of the central crankshaft bearing 2. On both sides of the periphery 3 of the crankshaft bearing 2 there are provided blind holes 4, 5 with threaded sections 6,7. The blind hole 4 is of lesser depth than the blind hole 5 since it otherwise would intersect the oil feed duct 24 for the crankshaft bearing.

In the case of ordinary internal combustion engines of this type, the screws provided with thread at their lower section are extended through the borehole of the upper crankcase part and screwed into the thread of the lower crankcase part whereby the two crankcase parts are clamped together. In this case the lower crankcase is stressed in tension.

Figure 2:
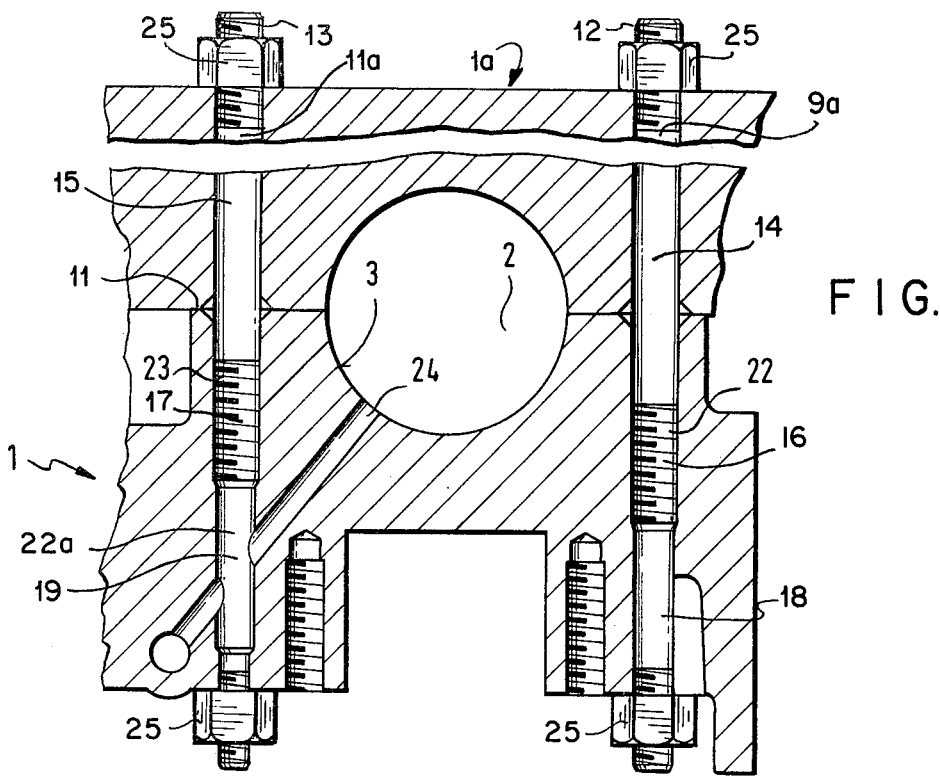
FIG. 2 shows crankcase halves of the internal combustion engine of the invention, seen in cross section.

FIG. 2 shows a crankcase halves or parts 1 and 1a of the internal combustion engine of the invention.

In this case the blind hole 4 is drilled in such a manner (see FIG. 1) that it intersects the oil feed duct 24 for the crankshaft bearing and is open at the other end of the crank-case half. Similarly the blind hole 5 is drilled in such a manner that it is also open towards the other side of the crank-case half 1.

Figure 3:
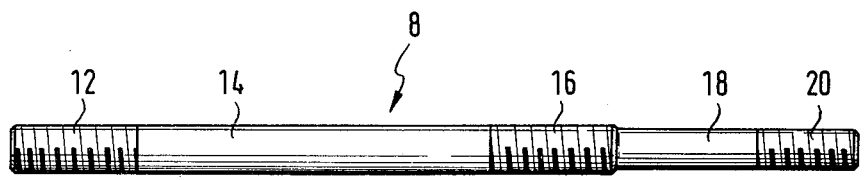
FIG. 3 is a view of a first tie rod.
Figure 4:
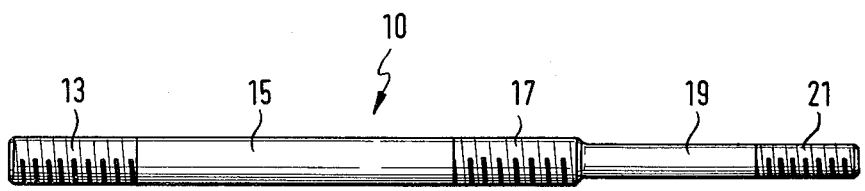
FIG. 4 is a view of a second tie rod.

FIG. 3 shows a first tie rod which is associated with the boreholes 9 and 9a in FIG. 2, while in FIG. 4 there is shown a second tie rod 10 which is associated with the boreholes 11 and 11a in FIG. 2. The two tie rods 8, 10 have a first identical threaded section 12, 13, a first shaft section 14, 15, the shaft section 14 being somewhat longer than the shaft section 15, a second or intermediate identical threaded section 16, 17, a second shaft section 18, 19, the shaft section 19 having a smaller diameter and a greater length than the shaft section 18, and a third threaded section 20, 21 of the same length, the threaded section 21, however, having a smaller diameter.

The first threaded section 12, 13, the first shaft section 14, 15 and the second threaded section 16, 17 correspond in their development to the ordinary screws for the clamping of the crankcase. The second shaft section 18 of the tie rod 8 has, in the embodiment shown by way of example, a diameter of 10 mm and is provided at its end with the third threaded section 20 having a thread diameter of 10 mm. The second shaft section 19 of the tie rod 10 has, in the embodiment shown by way of example, a diameter of 8 mm and is provided on its end with a third threaded section 21 having a thread diameter of 8 mm. Due to the smaller diameter of the second shaft section, an annular space 22a is formed between the borehole 11 and the shaft section 19, which space assures the supplying of oil to the crankshaft bearing via the oil feed duct 24.

The two crankshaft case halves 1 and 1a are now clamped together, the two tie rods being screwed into position in ordinary manner, in which connection the two intermediate male threaded sections 16, 17 are threaded into the female threaded sections 22, 23 of the boreholes 9, 11. Now nuts 25 are screwed onto the first and second threaded sections 12, 13; 20, 21 and the two crankshaft case halves are clamped together. The force introduced for clamping via the first threaded sections 12, 13 is now taken up on the one hand by the intermediate male threaded section 16, 17 and also by the third threaded section 20, 21, whereby a substantially more uniform distribution of force is assured in the second crankshaft case half and, upon increased clamping force, the tensile stressing of the second crankshaft case half remains below the critical limit within which cracks occur.

With a crankshaft case halves clamped in this manner it is now possible to increase the power of an ordinary mass-produced internal combustion engine in such a manner that when used as internal combustion engine for a glider it assures sufficient climbing ability of the glider, the vibrations introduced into the crankshaft by the propeller being reliably taken up by the crankshaft case halves.

I claim:

1. In an internal combustion engine suitable for the driving of an aircraft, comprising a bipartite crankshaft case of light metal having at least one bipartite crankshaft bearing having upper and lower halves to receive the crankshaft and screw-thread means arranged on both sides on the periphery of the crankcase bearing in order to clamp the crankshaft bearing halves together, said screw-thread means passing through continuously entirely unthreaded boreholes in said upper crankshaft bearing half, the combination characterized by the fact that in the lower crankshaft bearing half (1) there are provided continuous boreholes (9, 11) with female threaded sections (22, 23) in the region adjoining but spaced from said upper crankshaft bearing half and that first and second tie rods (8, 10) with first and second male threaded sections (12, 13, 20, 21) at the ends thereof for engagement with clamping nuts and intermediate male threaded sections (16, 17) which are threaded in the corresponding female threaded sections (22, 23) in the lower crankshaft bearing half (1), said first male threaded ends extended beyond said upper crankshaft bearing half and having said clamping nuts tightened thereon to clamp the two halves together and the second male threaded ends extending beyond said lower crankshaft bearing half and having said clamping nuts tightened thereon to place said lower half under compression, whereby stresses induced in said lower half by the crankshaft are relieved without putting said lower half under excessive compression.

2. In an internal combustion engine suitable for the driving of an aircraft, comprising a bipartite crankshaft case of light metal having at least one crankshaft bearing to receive the crankshaft and screw-thread means arranged on both sides on the periphery of the crankcase bearing in order to clamp the crankshaft case parts together, said screw-thread means passing through continuous unthreaded boreholes in a first crankshaft case part, the combination characterized by the fact that in the second crankshaft case part (1) there are provided continuous boreholes (9, 11) with female threaded sections (22, 23) in the region adjoining the first crankshaft case part and that first and second tie rods (8, 10) with first and second male threaded sections (12, 13, 20, 21) at the ends thereof for engagement with clamping nuts and intermediate male threaded sections (16, 17) which are threaded in the corresponding female threaded sections (22, 23) in the second crankshaft case part (1), said first male threaded ends extending beyond said first crankshaft case part and having said clamping nuts tightened thereon to clamp the two parts together and the second male threaded ends extending beyond said second crankcase part and having said clamping nuts tightened thereon to place said second part under compression, whereby stresses induced in said second part by the crankshaft are relieved without putting said second part under excessive compression and by the fact that the portions (14, 15) of the first and second tie rods (8, 10) between the first male threaded section and the intermediate male threaded section have the same shaft diameter as the boreholes through which they pass and the portion of at least one of the tie rods between said second male threaded section and said intermediate male threaded section has a smaller shaft diameter than the borehole in the second crankshaft case part through which it passes and by an oil duct which is intersected by said last-named borehole, whereby continuous flow-through of oil is assured by virtue of the annular space between said last-named borehole and the portion of the tie rod therein.

3. In an internal combustion engine suitable for the driving of an aircraft, comprising a bipartite crankshaft case of light metal having at least one crankshaft bearing to receive the crankshaft and screw-thread means arranged on both sides on the periphery of the crankcase bearing in order to clamp the crankshaft case parts together, said screw-thread means passing through continuous unthreaded boreholes in a first crankshaft case part, the combination characterized by the fact that in the second crankshaft case part (1) there are provided continuous boreholes (9, 11) with female threaded sections (22, 23) in the region adjoining the first crankshaft case part and that first and second tie rods (8, 10) with first and second male threaded sections (12, 13, 20, 21) at the ends thereof for engagement with clamping nuts and intermediate male threaded sections (16, 17) which are threaded in the corresponding female threaded sections (22, 23) in the second crankshaft case part (1), said first male threaded ends extending beyond said first crankshaft case part and having said clamping nuts tightened thereon to clamp the two parts together and the second male threaded ends extending beyond said second crankcase part and having said clamping nuts tightened thereon to place said second part under compression, whereby stresses induced in said second part by the crankshaft are relieved without putting said second part under excessive compression and by the fact that the portion of at least one of the tie rods between said second male threaded section and said intermediate male threaded section has a smaller shaft diameter than the borehole in the second crankshaft case part through which it passes and by an oil duct which is intersected by said last-named borehole, whereby continuous flow-through of oil is assured by virtue of the annular space between said last-named borehole and the portion of the tie rod therein.

* * * * *

UNITED STATES PATENT AND TRADEMARK OFFICE
CERTIFICATE OF CORRECTION

PATENT NO. : 4,318,375
DATED : March 9, 1982
INVENTOR(S) : Heinrich Sauer

It is certified that error appears in the above—identified patent and that said Letters Patent is hereby corrected as shown below:

In the Drawings - the Title Page Figure and Sheet 2 of the Drawings, Figure 2.- Rod 19 should be shown spaced from the borehole 11 and reference numeral 22a should refer to the annular space between the rod 19 and the borehole 11.
Col. 1, line 54; insert a comma (,) after "stress"
Col. 4, line 5; "extended" should read -- extending --

Signed and Sealed this

Sixth Day of July 1982

[SEAL]

Attest:

GERALD J. MOSSINGHOFF

Attesting Officer     Commissioner of Patents and Trademarks